(12) United States Patent
Khan (10) Patent No.: US 12,237,649 B2
(45) Date of Patent: Feb. 25, 2025

(54) SPARK IGNITER WITH MAGNETIC FIELD FOR PUSHING SPARK

(71) Applicant: PRATT & WHITNEY CANADA CORP., Longueuil (CA)

(72) Inventor: Sarmad Khan, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/191,181

(22) Filed: Mar. 28, 2023

(65) Prior Publication Data

US 2024/0332915 A1  Oct. 3, 2024

(51) Int. Cl.
| | |
|---|---|
| H01T 13/22 | (2006.01) |
| F02C 7/264 | (2006.01) |
| F02C 7/266 | (2006.01) |
| F02K 9/95 | (2006.01) |
| H01T 13/40 | (2006.01) |
| H01T 13/41 | (2006.01) |
| H01T 13/42 | (2006.01) |
| H01T 13/50 | (2006.01) |
| H01T 13/52 | (2006.01) |

(52) U.S. Cl.
CPC ............. *H01T 13/22* (2013.01); *F02C 7/264* (2013.01); *F02C 7/266* (2013.01); *F02K 9/95* (2013.01); *H01T 13/40* (2013.01); *H01T 13/41* (2013.01); *H01T 13/42* (2013.01); *H01T 13/50* (2013.01); *H01T 13/52* (2013.01)

(58) Field of Classification Search
CPC ......... H01T 13/22; H01T 13/40; H01T 13/41; H01T 13/42; H01T 13/50; H01T 13/52; F02K 9/95; F02C 7/264; F02C 7/266
See application file for complete search history.

(56) References Cited

U.S. PATENT DOCUMENTS

| | | | |
|---|---|---|---|
| 2,635,423 A | | 4/1953 | Oakes et al. |
| 5,555,862 A | * | 9/1996 | Tozzi ...................... H01T 13/54 |
| | | | 123/143 B |
| 5,587,630 A | * | 12/1996 | Dooley ................... F02P 15/10 |
| | | | 315/209 T |

(Continued)

FOREIGN PATENT DOCUMENTS

| | | |
|---|---|---|
| DE | 19607654 A1 | 9/1997 |
| GB | 1146244 A | 3/1969 |

(Continued)

*Primary Examiner* — Kyle Robert Thomas
(74) *Attorney, Agent, or Firm* — Norton Rose Fulbright Canada LLP (57) ABSTRACT

The igniter can have a first conductor having a tip extending along an axis and forming a positive terminal; a second conductor having a tip surrounding the tip of the first conductor around the axis and forming a negative terminal; an insulator filling a space between the first conductor and the second conductor, a spark path extending radially, relative the axis, between the tip of the first conductor and the tip of the second conductor, from the positive terminal to the negative terminal; at least one magnet operable to generate a magnetic field B, the magnetic field B having a magnetic field orientation extending circumferentially around the axis, the at least one magnet disposed radially, relative the axis, between the first conductor and the second conductor, the at least one magnet embedded within the insulator.

16 Claims, 8 Drawing Sheets

(56) References Cited

U.S. PATENT DOCUMENTS

| | | | |
|---|---|---|---|
| 5,619,959 A | 4/1997 | Tozzi | |
| 6,568,362 B2* | 5/2003 | Whealton | ............... H01T 13/40 123/143 B |
| 6,929,727 B2 | 8/2005 | Gorokhovsky | |

FOREIGN PATENT DOCUMENTS

| | | |
|---|---|---|
| JP | 2001076841 A | 3/2001 |
| JP | 2010203295 A | 9/2010 |
| WO | 2022229774 | 11/2022 |
| WO | 2022229803 | 11/2022 |

* cited by examiner

SPARK IGNITER WITH MAGNETIC FIELD FOR PUSHING SPARK

TECHNICAL FIELD

The application relates generally to gas turbine engines and, more particularly, to igniters.

BACKGROUND OF THE ART

Igniters such as "spark plugs" are well known to the field of combustion engines and are used in the ignition of the mixture air and gas. In a gas turbine engine, once combustion is established in the combustor, the combustion may then typically sustain itself without the action of the igniter during a period of operation. One of the challenges associated to igniters is that they typically have an igniting portion, or tip, which is exposed to the combustion chamber. The combustion chamber can reach high temperatures during engine operation, especially in the case of some gas turbine engines. The igniter therefore needs to be resilient to the high temperatures which can be expected during operation of the igniter. The igniter may also need to be resilient to corrosion which may be spurred by higher temperatures, as corrosion may lead to a decrease in spark efficiency. This imposes constraints on igniter designs, including in terms of geometry and materials. Moreover, while on the one hand, positioning the igniting portion deeper into the combustion chamber may facilitate the ignition function, this may on the other hand lead to exposing the igniter to higher temperatures during operation, as the temperature may be higher deeper into the combustion chamber. Although igniters were satisfactory to a certain degree, there always remains room for improvement. In particular, even good igniters are expected to fail after a specific failure life span and loss of spark efficiency can be expected over time due to factors such as corrosion stemming from the repeated combustions in the vicinity of the igniter.

SUMMARY

In one aspect, there is provided an igniter comprising a first conductor extending along a length of the igniter; a second conductor extending alongside and spaced apart from the first conductor; an insulator filling a space between a portion of the first conductor and a portion of the second conductor, with a tip of the first conductor protruding from the insulator and forming a positive terminal, and a tip of the second conductor positioned adjacent the tip of the first conductor and forming a negative terminal; a spark path extending from the positive terminal to the negative terminal; an electromagnet embedded within the insulator, between the first conductor and the second conductor, and having a magnetic field axis extending from a north pole to a south pole, the magnetic field axis extending transversally relative the spark path.

In another aspect, there is provided a gas turbine engine comprising in serial flow communication a compression section, a combustor, and a turbine section, and an ignition subsystem having at least one igniter, the at least one igniter having a first conductor having a tip extending along an axis and forming a positive terminal, the tip of the first conductor exposed to a combustion chamber in the combustor; a second conductor having a tip surrounding the tip of the first conductor around the axis and forming a negative terminal, the tip of the second conductor exposed to a combustion chamber in the combustor; an insulator filling a space between the first conductor and the second conductor, with the tip of the first conductor and the tip of the second conductor protruding from the insulator; a spark path extending radially, relative the axis, between the tip of the first conductor and the tip of the second conductor, from the positive terminal to the negative terminal; and at least one magnet operable to generate a magnetic field B, the magnetic field B having a magnetic field orientation extending circumferentially around the axis, the at least one magnet disposed radially, relative the axis, between the first conductor and the second conductor, the at least one magnet embedded within the insulator.

In a further aspect, there is provided an igniter comprising a first conductor having a tip extending along an axis and forming a positive terminal; a second conductor having a tip surrounding the tip of the first conductor around the axis and forming a negative terminal; an insulator filling a space between the first conductor and the second conductor, with the tip of the first conductor and the tip of the second conductor protruding from the insulator; a spark path extending radially, relative the axis, between the tip of the first conductor and the tip of the second conductor, from the positive terminal to the negative terminal; and at least one magnet operable to generate a magnetic field B, the magnetic field B having a magnetic field orientation extending circumferentially around the axis, the at least one magnet disposed radially, relative the axis, between the first conductor and the second conductor, the at least one magnet embedded within the insulator.

DESCRIPTION OF THE DRAWINGS

Reference is now made to the accompanying figures in which.

DETAILED DESCRIPTION

Figure 1:
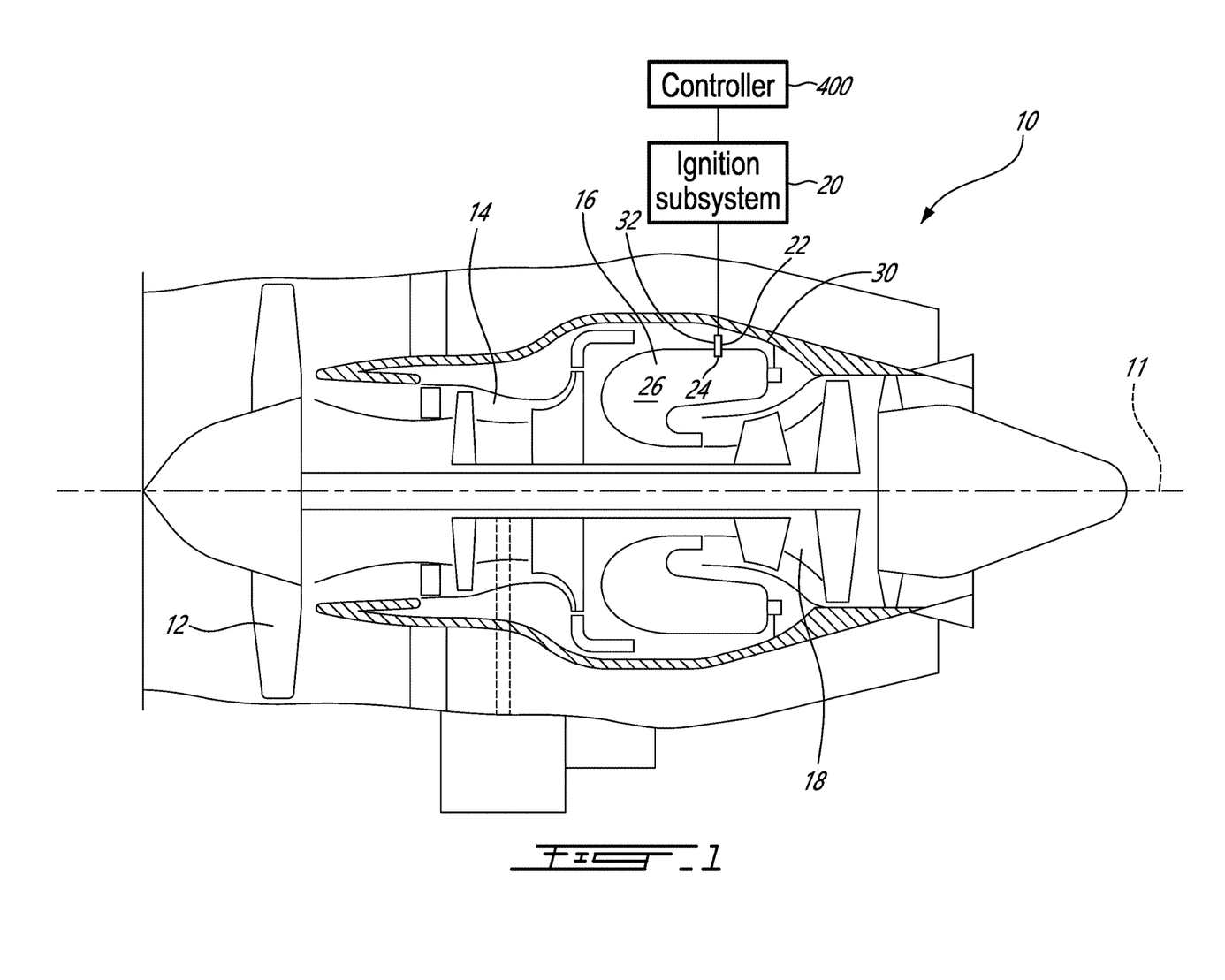
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The gas turbine engine 10 further comprises an ignition subsystem 20 which can include one or more igniters 22 associated to the combustor 16, with an igniting portion 24 or tip of the igniter(s) exposed to the one or more combustion chambers 26 enclosed by the combustor. The ignition subsystem 20 can be controlled by a controller 400, which may be or include a computer.

The combustion chamber 26 enclosed by the combustor 16 is an area where combustion occurs, and the temperature and pressure may be very high in this area. Typically cooler air is circulated around the combustor 16, such as between the combustor 16 and an engine casing 30, and has the effect of controlling the temperature of the combustor 16. The igniter 22 can have a body including a portion which is secured to the combustor 16 or engine casing 30 and an igniting portion 24 which is exposed to the combustion chamber 26 inside the combustor 16. A portion 32 of the igniter can be withdrawn into the cooler air circulated around the combustor 16, such as between the combustor 16 and the engine casing 30, to manage the temperature of the igniter 22 throughout the operating envelope. The igniting portion 24 or tip of the igniter is typically within the combustor 16 and exposed to the combustion chamber 26. The portion 32 of the igniter 22 which is withdrawn from the combustion chamber 26 can be configured to act as a heat sink.

Figure 2A:
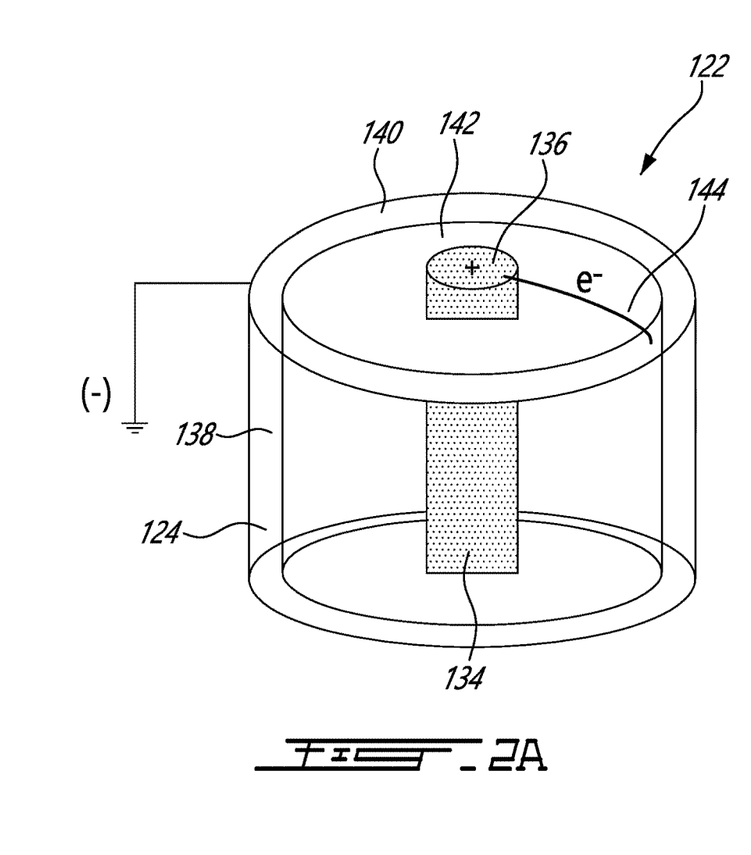
FIG. 2A is a schematic view of an igniter in accordance with one embodiment.

Referring to FIG. 2A, a first embodiment of an igniter 122 is shown. The igniter 122 is of a type having a igniting portion 124 generally cylindrical geometry with a first conductor 134 leading to a tip 136 in the form of a central pin, and a second conductor 138 leading to a tip 140 in the form of an annulus surrounding the central pin. The tip of the first conductor 134, or central pin, is used as a positive terminal during use, and is thus an electrically positive terminal. The tip of the second conductor 140, or annulus (or shell), is used as a negative terminal during use and is thus an electrically negative terminal. An insulator 142 fills a space between the first conductor 134 and the second conductor 138. The insulator 142 can be both an electrical insulator and a thermal insulator and can be embodied in the form of a potting. A spark path 144 extends from the positive terminal to the negative terminal. Indeed, during use, a spark consisting of electrons travelling across the ambient media may be generated when the voltage between the positive terminal and the negative terminal exceeds the dielectric resistance of the media and leads to dielectric breakdown of the media. The media can be the air/fuel mixture. The spark path 144 taken by the electrons may be the most direct path between the positive terminal and the negative terminal, where the electrical field will be the strongest. In a context such as this one where the annulus is centered around the central pin, the arc may randomly choose one angle amongst the multitude of different angles it could take. The expression "spark path" 144 in this context can refer to the annular region representing the multiple possible angles from the positive terminal to the negative terminal. In the embodiment of FIG. 2A, the individual arc paths are straight and the spark path 144 can thus be disc-shaped.

Figure 2B:
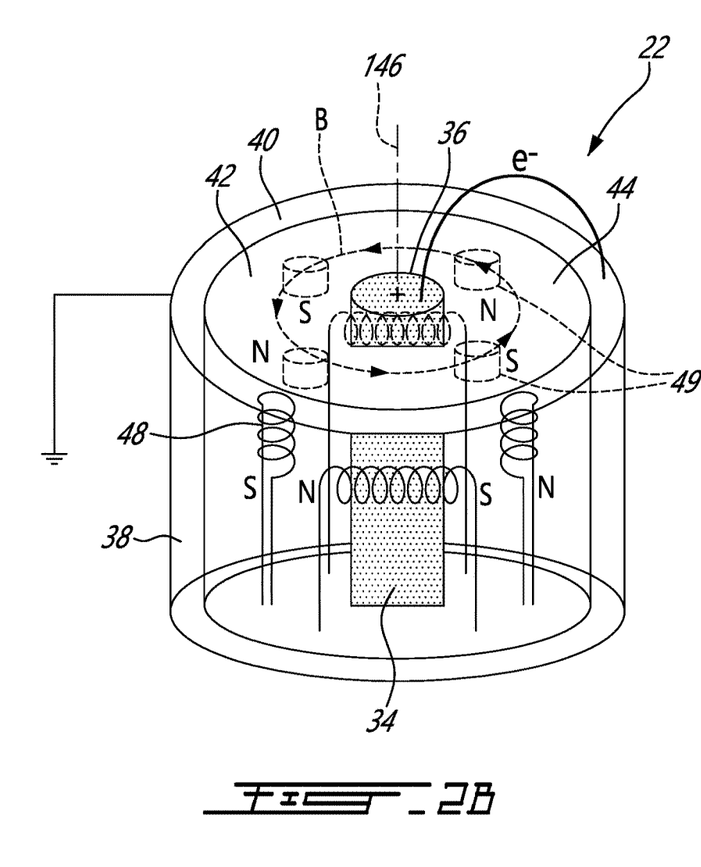
FIG. 2B is a schematic view of an igniter in accordance with another embodiment.

FIG. 2B presents a second embodiment of an igniter 22. In the embodiment presented in FIG. 2B, the elements described above with respect to FIG. 2A can all be present. For ease of reference, let us use cylindrical coordinates to define an axial orientation 46 coinciding here with the tip of the first conductor 36. In addition to these elements, a circumferentially-oriented magnetic field B is provided at the spark path 44. When the electrons of the spark cross the gap between the positive terminal and the negative terminal, in a generally "radial" orientation, they individually have a charge q travelling at a velocity v across the magnetic field B. As per the Lorentz force equation $$F = qE + qv \times B \tag{1}$$

in addition to an "electrically" driven force component qE associated to the difference of potential between the positive terminal and the negative terminal, the electrons will further be subjected to a "magnetically" driven force component qv×B, or otherwise said, the vector cross product of the charge velocity qv and the magnetic field amplitude direction B. In a context where the magnetic field orientation is transversal to the (radial) orientation of the displacement of the charges (and more specifically here circumferential), an additional magnetic force component qv×B will be exerted on the charges in the axial orientation. Depending on the circumferential direction of the magnetic field (i.e. clockwise or counter-clockwise), this force will be either axially inward, i.e. towards the insulator, or axially outward, i.e. into the combustion chamber. By appropriately selecting one of the two circumferential directions, the force may thus be generated axially outwardly, curving the spark path into a toroidal surface section and forcing the electrons of the arc to curve deeper into the combustion chamber on their way to the negative terminal as shown.

For an equivalent effect in terms of ignition efficiency, this spark path curving effect may allow to retract the tip of the igniter from the combustion chamber to a somewhat lower temperature region, and thereby alleviate the thermally-imparted constraints on the design of the igniter and/or improve its durability.

Such a circumferentially oriented magnetic field B may be generated by one or more magnet 48 which are integrated to the igniter 22, and which may more specifically be embedded within the insulator 42, radially between the first conductor 34 and the second conductor 38, and axially offset/retracted relative the tips 36, 40. In particular, a plurality of magnets, such as 3, 4, 5, 6 or more magnets for instance, can be circumferentially aligned relative one another, around the central pin, and embedded within the insulator. More specifically, the magnets 48, which can be electromagnets, may have individual magnetic field axes extending between a north pole N and a south pole S, and these magnetic field axes can be oriented circumferentially, or tangentially, relative the axis 46.

Figure 3:
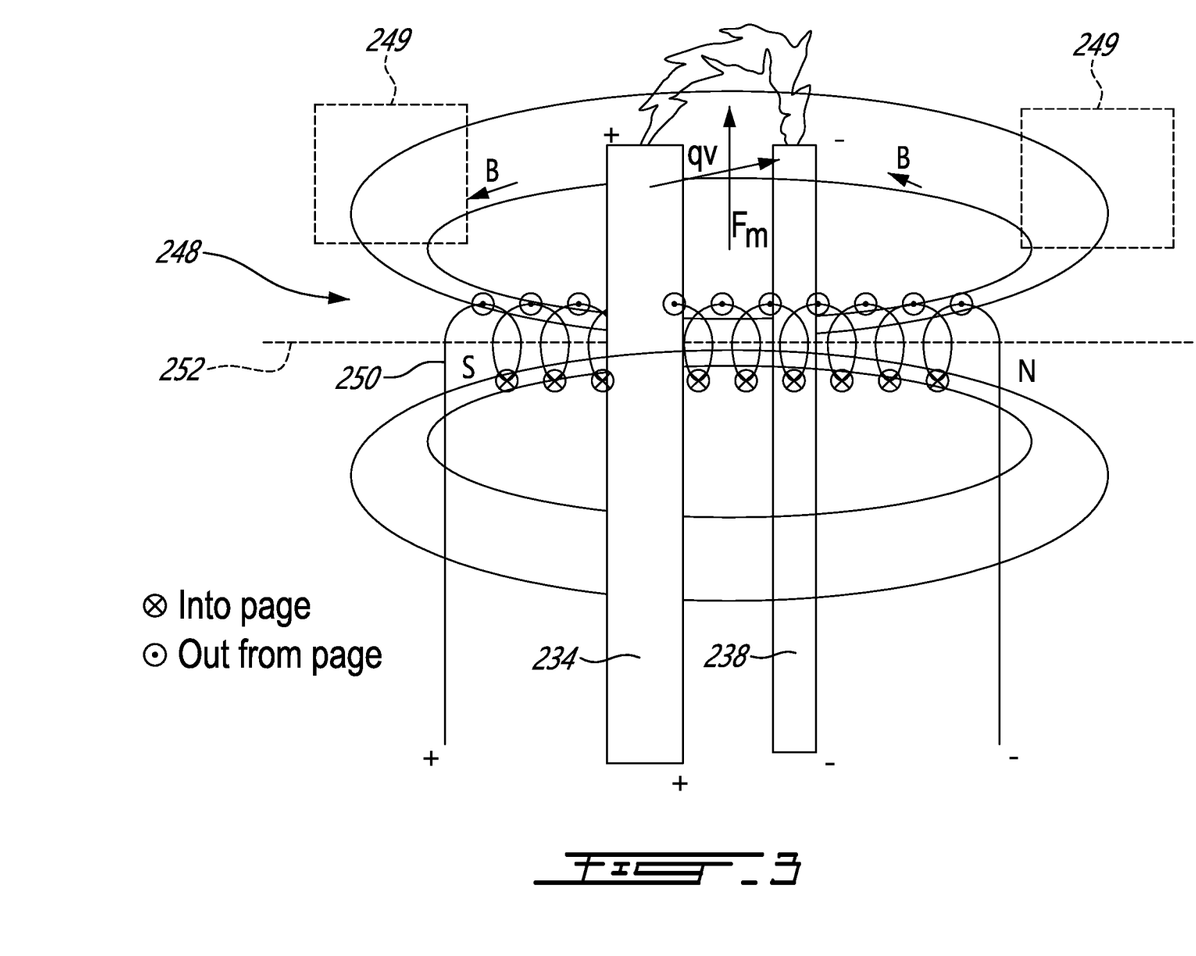
FIG. 3 is a schematic view showing relative orientations of a magnetic field, a charge velocity, and a magnetic force.

This force will now be explained in greater detail with reference with FIG. 3. Taking the example of an electromagnet 248 formed with a coil wrapped around a magnetic field axis. In accordance with the laws of electromagnetism, current circulating in the electric wire will generate a magnetic field circumferential to the length of the wire. In the context of a coil, the magnetic field generated by the different windings add up and generate a high magnetic field strength oriented along the magnetic field axis 252. A magnetic core (not shown for simplicity) may be provided within the winding, along the magnetic field axis 252, to both facilitate the wrapping of the coil and amplify the magnetic field strength. Depending on the circumferential direction, around the magnetic field axis, around which the coil is wrapped around the core, and the current direction along the wire, the magnetic field B will either exit one end of the coil or the other, defining a north pole N and a south pole P. In the example of FIG. 3, the upper portion of the coil comes out from the page, the lower portion of the coil goes into the page, the positive terminal is at the left and the negative is at the right, leading to a north pole N on the right side and a south pole S on the right side. The magnetic field lines close back from the north pole N to the south pole S outside the core in a region of magnetic field strength which diminishes as the location is farther and farther away from the coil 252.

Still referring to FIG. 3, a first conductor 234 in the form of an elongated positive terminal or anode (+) and a second conductor 238 in the form of an elongated negative terminal or cathode (−) are shown, with the electromagnet 248 provided between the positive terminal and the negative terminal, and normal to both i) the orientation of the positive terminal or negative terminal, and ii) the electric field orientation extending between the negative terminal and the positive terminal. Upon travelling from the positive tip to the negative tip, the electrons will be subjected to an electric force qE driving their motion in the orientation qv between the positive tip and the negative tip. However, as per equation 1, the electrons, which represent charges in motion, will further be subjected to a magnetic force $F_m$. The amplitude and orientation of the magnetic force $F_m$ will correspond to the vector cross product of the magnetic charge velocity qv and of the magnetic field orientation B at their instantaneous position. As per the "right hand rule" for a vector cross product, the resulting magnetic force $F_m$ will be in the orientation away from the electromagnet, as per the arrow shown in FIG. 3. The resulting path which will be taken by the electrons will be the result of the combination between the electrical and magnetic forces and will curve away from the electromagnet before coming back at the negative terminal. If the coil 248 was wound in the opposite direction, the north pole N and the south pole S would be inversed, and the resulting magnetic force would be in the orientation towards the electromagnet, which would not have the effect of "pushing" the spark deeper into the combustion chamber.

Referring back to the example presented in FIG. 2B, extending this concept to a cylindrical geometry, the direction of the magnetic field B can be selected to be counter-clockwise (i.e. a counter-clockwise circumferential direction) around the axis 46 when viewed in an axial direction from the spark path to the at least one magnet (i.e. looking at the tip of the igniter from the combustion chamber), to lead to pushing of the spark path deeper into the combustion chamber by the magnetic field, independently of which angle around the axis 46 the spark actually takes as it travels from the positive terminal to the negative terminal.

Figure 4:
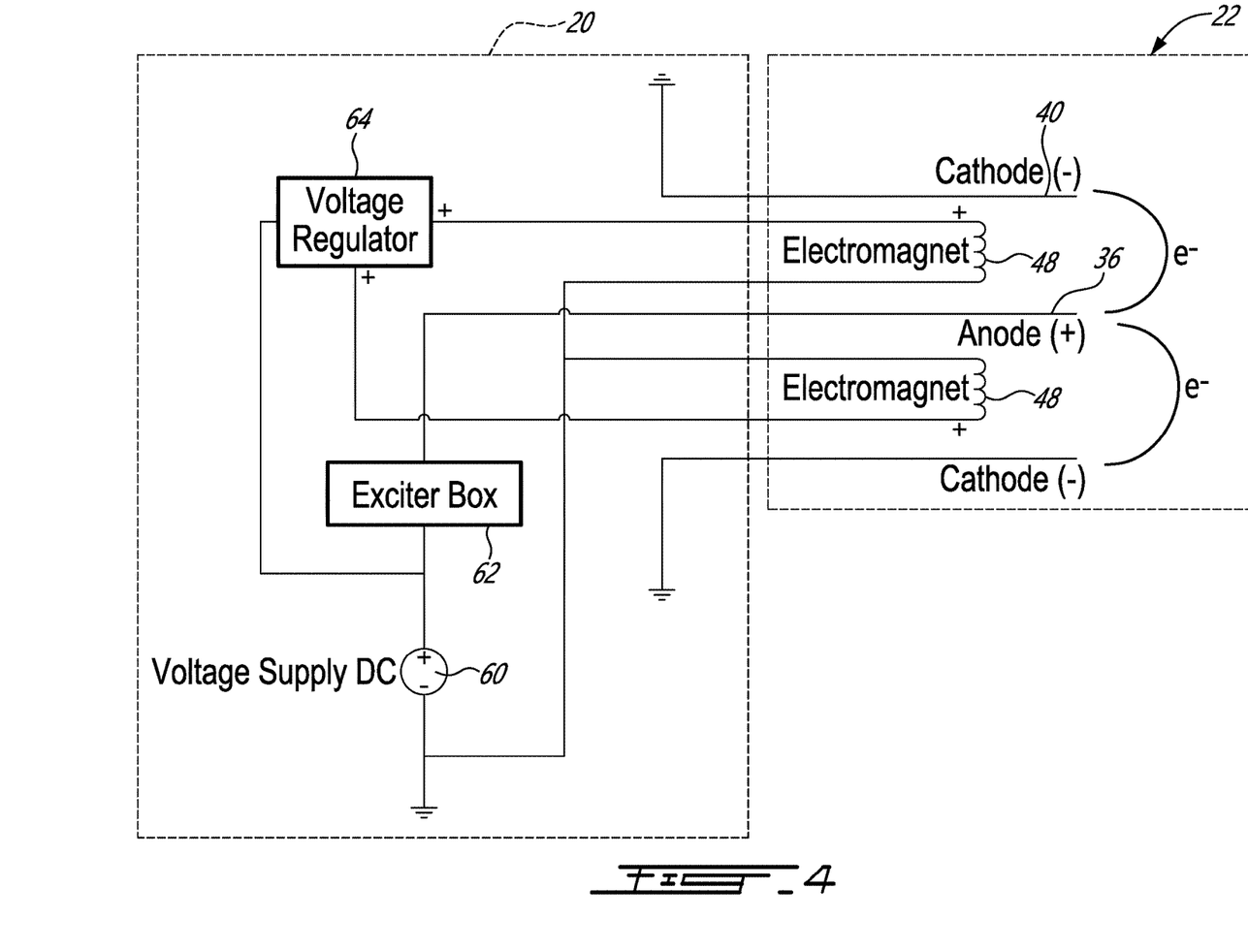
FIG. 4 is an electrical circuit schematic of an igniter and an ignition subsystem.

FIG. 4 presents an example schematic of an igniter subsystem 20 which may be associated to an igniter 22 such as shown in FIG. 2B, except that in the simplified schematic of FIG. 4, only two electromagnets 48, rather than four, are schematized. In this example, a single voltage supply 60 is used to drive both the electromagnets 48 and the sparks (positive terminal/negative terminal). A positive terminal of the voltage source 60 can be connected to an exciter box or exciter 62, which leads to the positive terminal, and to a voltage regulator 64, which leads to a positive terminal of the electromagnets 48. A negative terminal of the electromagnets 48, of the voltage supply, and the negative terminal, may be grounded. The voltage regulator 64 can have the role of supplying a controlled, moderate, voltage across the electromagnets 48 in a manner, for instance, to generate a relatively stable magnetic field of an appropriate strength for pushing the spark into the combustion chamber by an appropriate amount. The exciter 62 can have the role of accumulating a very high voltage and to then discharge a strong current as a spark. Either one, or more than one of the voltage regulator 64, exciter 62 and voltage supply 60 may be controlled by a controller 400.

The components of the igniter subsystem 20 such as the voltage supply 60 and exciter may be included as part of a body of the igniter itself, such as a portion 32 of the igniter 22 which is maintained away from the highest temperature regions of the combustion chamber 26 throughout operation, in which case a single electrical connection may be used as the voltage supply 60. In an alternate embodiment, the voltage supply and exciter may be embodied as part of a component which is distinct from the igniter, and electrically connected thereto. In still a further alternate embodiment, the voltage regulator and/or the exciter may be omitted or substituted by one or more other suitable components. In an alternate embodiment, the voltage regulator and the exciter can be connectable via distinct electrical terminals.

Referring back to the embodiment presented in FIG. 2B, it will be understood that in alternate embodiments, a different number of magnets 48 may be used. For instance, there may be 6 magnets, 8 magnets, or still a different number of magnets 48. The magnets may be circumferentially aligned with one another, with the north poles all pointing clockwise (having a clockwise circumferential direction) and the south poles all pointing counter-clockwise (having a counter-clockwise circumferential direction) when viewed from the combustion chamber.

It will be noted here that in practice, since the magnets of the plurality of circumferentially interspaced magnets are discrete in the illustrated embodiment, the overall magnetic field, while still generally having a "counter-clockwise" direction when taking the individual magnets collectively, will be irregular and in particular, will have regions of significantly weaker magnetic field, interspersed circumferentially with the magnets. More specifically, represented schematically here by dashed-line cylinders, regions of weaker magnetic field 49 will be present circumferentially at circumferential positions corresponding to gaps between corresponding adjacent pairs of magnets 48. Referring back to FIG. 3, these regions of weaker magnetic field 249 are associated with corresponding ends of the magnets, where the magnetic field lines close back towards the core rather than extending parallel to the core.

Figure 5A:
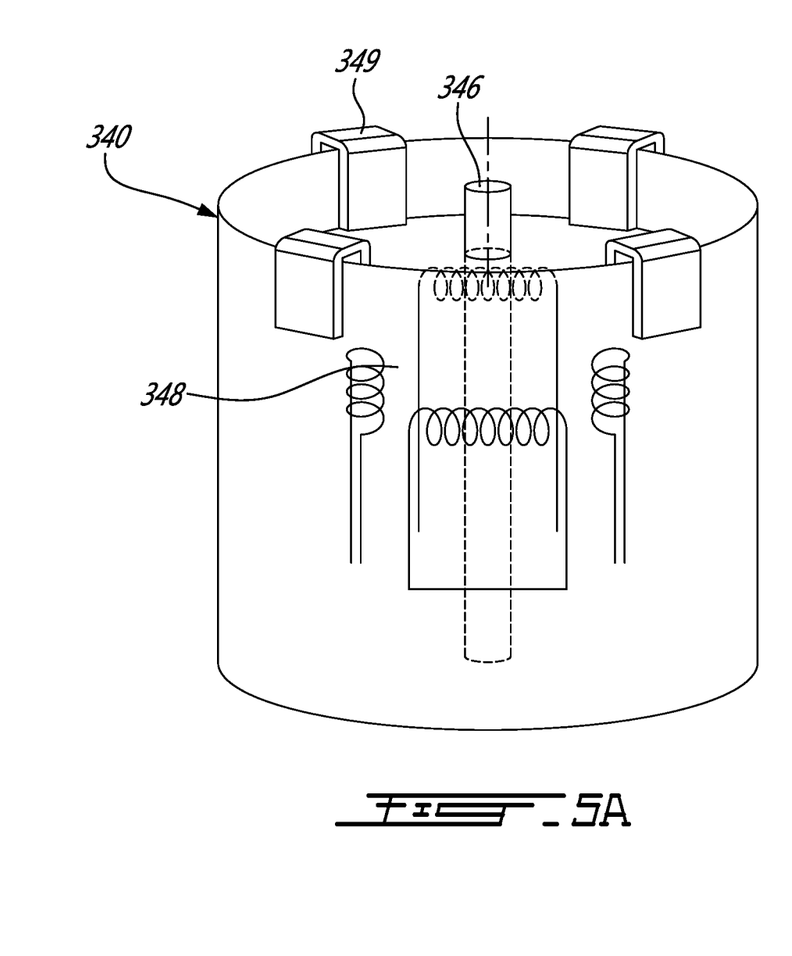
FIG. 5A is a schematic view of another embodiment of an igniter.
Figure 5B:
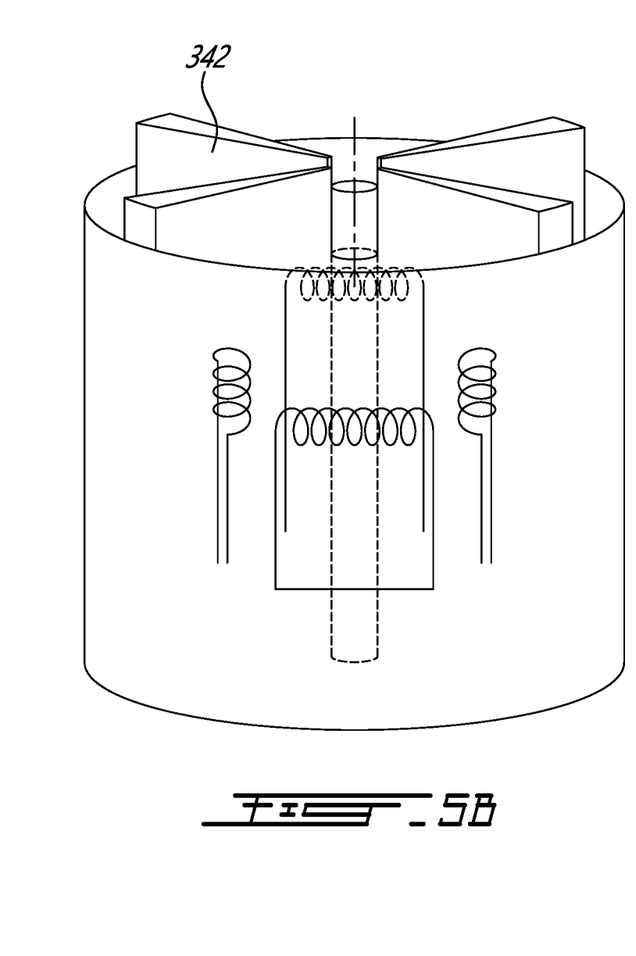
FIG. 5B is a schematic view of another embodiment of an igniter.

Referring back to a cylindrical geometry such as shown in FIG. 2B, it will be understood that while a spark travelling above either one of the magnets 48 may be suitably deflected outwardly by the magnetic field, a spark travelling across either one of the regions of weaker magnetic field 49 may be less suitably deflected outwardly given the weaker or differently oriented magnetic field. It may be preferred to impede sparks from forming in the regions of weaker magnetic field 49. FIGS. 5A and 5B present two example ways of addressing this.

In the embodiment presented in FIG. 5A, the annular tip 340 of the second conductor has a plurality of insulating caps 349. The insulating caps 349 are located circumferentially between corresponding pairs of the magnets 348, at an axial position of the spark path, and are configured to prevent a spark from extending across a region of weaker magnetic field 49. Accordingly, the plurality of insulating caps 349 constitute a plurality of insulator elements, each insulator element located circumferentially between a corresponding pair of magnets 348 of the plurality of magnets, and intersecting the spark path.

In the embodiment presented in FIG. 5B, the insulator 342 itself is provided with an irregular shape. More specifically, the tip of the insulator 342 is crenellated, and has a plurality of crenels protruding axially, between the annular tip 340 of the second conductor and the central tip 346 of the first conductor. The crenels are located circumferentially between corresponding pairs of the magnets 348, at an axial position of the spark path, and are configured to prevent a spark from extending across a region of weaker magnetic field. Accordingly, the protruding crenels constitute a plurality of insulator elements, each insulator element located circumferentially between a corresponding pair of magnets 348 of the plurality of magnets, and intersecting the spark path.

Figure 6:
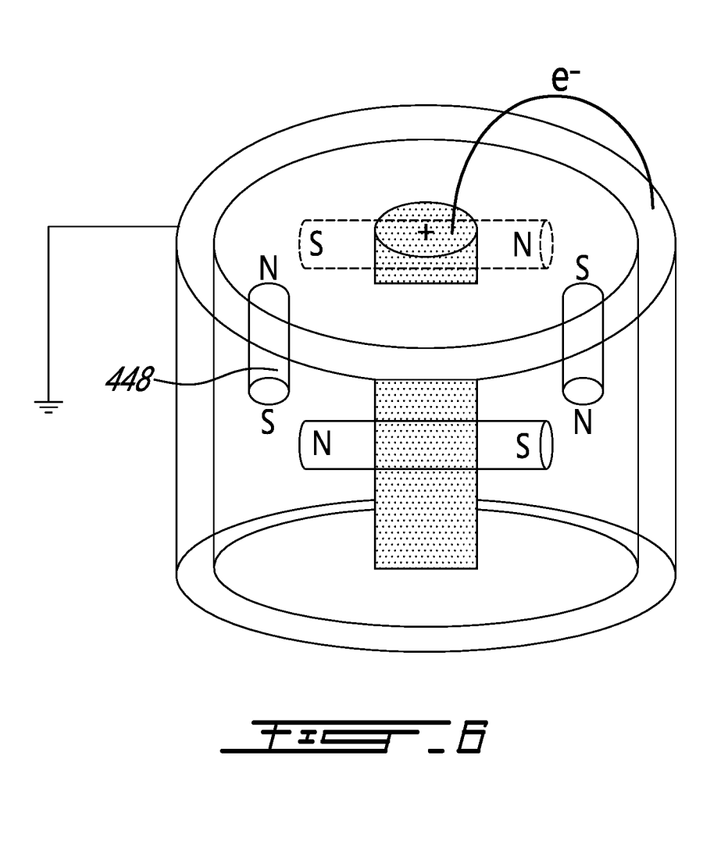
FIG. 6 is a schematic view of another embodiment of an igniter.

FIG. 6 presents a second variant to the embodiment of FIG. 2B. In the embodiment of FIG. 6, permanent magnets 448, more specifically four straight bar magnets having lengthwisely opposite poles, are used instead of the electromagnets 48 which are illustrated in the embodiment of FIG. 2B. Similarly to the electromagnets 48 which are illustrated in the embodiment of FIG. 2B, the permanent magnets are interspaced from one another in the circumferential orientation. The permanent magnets 448 have south poles oriented counter-clockwise relative the axis when viewed from the combustion chamber. Accordingly, a magnet may be either a permanent magnet or an electromagnet. In some embodiments, permanent magnet material may be suitable. In other embodiments, permanent magnet material may be deemed too sensitive to heat and not be suitable, particularly in the context where the igniters are associated to the combustion chamber of gas turbine engines. This being said, permanent magnets embedded in a suitable insulator material may nonetheless be suitable to some embodiments.

Figure 7:
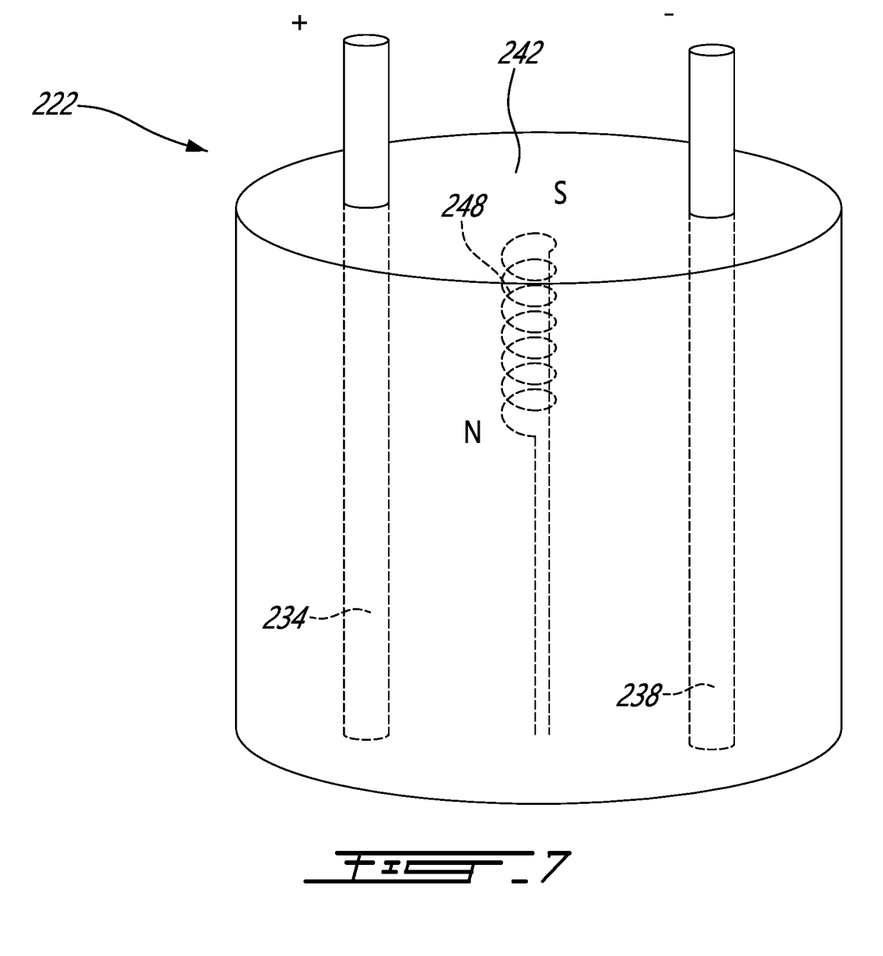
FIG. 7 is a schematic view of another embodiment of an igniter.

FIG. 7 presents yet another embodiment of an igniter 222. In the embodiment presented in FIG. 7, the first conductor 234 and the second conductor 238 both lead to tips in the form of pins which protrude from the insulator 242. An electromagnet 248 is embedded in the insulator 242, between the pins. The magnetic field generated by the electromagnet can have the effect of curving the spark path away from the electromagnet, deeper into the combustion chamber, such as schematized in FIG. 3. The spark path extends from the positive terminal (+) to the negative terminal (−) and the north pole can be oriented towards the right hand side from the perspective of moving along the spark path.

Figure 8:
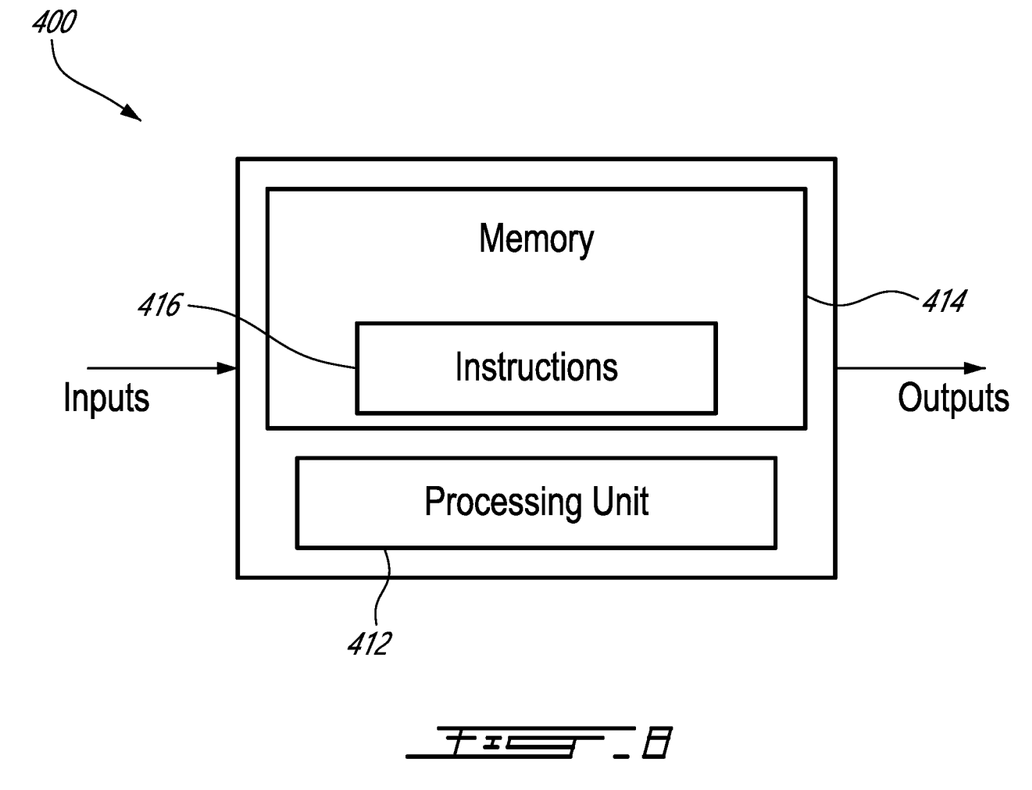
FIG. 8 is a block diagram of a computer.

Referring to FIG. 8, it will be understood that the expression "computer" 400 as used herein is not to be interpreted in a limiting manner. It is rather used in a broad sense to generally refer to the combination of some form of one or more processing units 412 and some form of memory system 414 accessible by the processing unit(s). The memory system can be of the non-transitory type. The use of the expression "computer" in its singular form as used herein includes within its scope one or more processing units working to perform a given function.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

A computer can have one or more input/output (I/O) interface to allow communication with a human user and/or with another computer via an associated input, output, or input/output device such as a keyboard, a mouse, a touchscreen, an antenna, a port, etc. Each I/O interface can enable the computer to communicate and/or exchange data with other components, to access and connect to network resources, to serve applications, and/or perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, Bluetooth, WiMAX), SS7 signaling network, fixed line, local area network, wide area network, to name a few examples.

It will be understood that a computer can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a computer or a processing unit, the expression "configured to" relates to the presence of hardware or a combination of hardware and software which is operable to perform the associated functions. In the context of this specification, a computer or controller can be implemented in a cloud based, or virtual-machine based manner via software applications.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, in still a further embodiment, the magnetic field may be induced by arc current directed through a small number of turns, where the arc's fast di/dt may induce a strong magnetic field. Yet further modifications could be implemented by a person of ordinary skill in the art in view of the present disclosure, which modifications would be within the scope of the present technology.

The invention claimed is:

1. An igniter comprising:
a first conductor having a tip extending along an axis and forming a positive terminal;
a second conductor having a tip surrounding the tip of the first conductor around the axis and forming a negative terminal;
an insulator filling a space between the first conductor and the second conductor, with the tip of the first conductor and the tip of the second conductor protruding from the insulator;
a spark path extending radially, relative the axis, between the tip of the first conductor and the tip of the second conductor, from the positive terminal to the negative terminal; and
at least one magnet operable to generate a magnetic field B extending circumferentially around the axis, the magnetic field B having a magnetic field orientation extending circumferentially around the axis, the at least one magnet disposed radially, relative the axis, between the first conductor and the second conductor, the at least one magnet embedded within the insulator.

2. The igniter of claim 1 wherein a portion of the magnetic field B extending at the spark path has a counter-clockwise direction relative the axis when viewed in an axial direction extending from the spark path towards the at least one magnet.

3. The igniter of claim 1 wherein the at least one magnet includes a plurality of magnets interspaced from one another circumferentially relative the axis, each magnet of the plurality of magnets having a length extending tangentially relative the axis, a north pole oriented clockwise relative the axis, and a south pole oriented counter-clockwise relative the axis when viewed in an axial direction extending from the spark path towards the at least one magnet.

4. The igniter of claim 3 further comprising a plurality of insulator elements, each insulator element located circumferentially between a corresponding pair of magnets of the plurality of magnets, and intersecting the spark path.

5. The igniter of claim 1 wherein the at least one magnet is at least one electromagnet.

6. The igniter of claim 1 wherein the at least one magnet is at least one permanent magnet.

7. A gas turbine engine comprising: in serial flow communication a compression section, a combustor, and a turbine section, and an ignition subsystem having at least one igniter, the at least one igniter having
   a first conductor having a tip extending along an axis and forming a positive terminal, the tip of the first conductor exposed to a combustion chamber in the combustor;
   a second conductor having a tip surrounding the tip of the first conductor around the axis and forming a negative terminal, the tip of the second conductor exposed to a combustion chamber in the combustor;
   an insulator filling a space between the first conductor and the second conductor, with the tip of the first conductor and the tip of the second conductor protruding from the insulator;
   a spark path extending radially, relative the axis, between the tip of the first conductor and the tip of the second conductor, from the positive terminal to the negative terminal; and
   at least one magnet operable to generate a magnetic field B extending circumferentially around the axis, the magnetic field B having a magnetic field orientation extending circumferentially around the axis, the at least one magnet disposed radially, relative the axis, between the first conductor and the second conductor, the at least one magnet embedded within the insulator.

8. The gas turbine engine of claim 7 wherein a portion of the magnetic field B extending at the spark path has a counter-clockwise direction relative the axis when viewed from the combustion chamber.

9. The gas turbine engine of claim 7 wherein the at least one magnet includes a plurality of magnets interspaced from one another circumferentially relative the axis, each magnet of the plurality of magnets having a length extending tangentially relative the axis, a north pole oriented clockwise relative the axis, and a south pole oriented counter-clockwise relative the axis when viewed in an axial direction extending from the spark path towards the at least one magnet.

10. The gas turbine engine of claim 9 further comprising a plurality of insulator elements, each insulator element located circumferentially between a corresponding pair of magnets of the plurality of magnets, and intersecting the spark path.

11. The gas turbine engine of claim 10 wherein the ignition subsystem further comprises at least one voltage source, a voltage regulator connected between the at least one voltage source and the first conductor; and an exciter connected between the at least one voltage source and the positive terminal.

12. The gas turbine engine of claim 11 wherein the second conductor and the negative terminal are grounded.

13. The gas turbine engine of claim 11 wherein the voltage regulator and the exciter are integrated to a body of the igniter.

14. The gas turbine engine of claim 11 wherein the at least one voltage source is a single voltage source having a positive terminal connected to both the voltage regulator and the exciter.

15. The gas turbine engine of claim 7 wherein the at least one magnet is at least one electromagnet.

16. The gas turbine engine of claim 7 wherein the at least one magnet is at least one permanent magnet.

* * * * *